United States Patent [19]

Budraitis et al.

[11] 4,195,563
[45] Apr. 1, 1980

[54] SENSOR FOR RECIPROCATING PRESS

[75] Inventors: Tadas Budraitis, Midlothian; Gerald W. Seliga, Frankfort, both of Ill.

[73] Assignee: Productronix, Inc., Oak Forest, Ill.

[21] Appl. No.: 920,714

[22] Filed: Jun. 30, 1978

[51] Int. Cl.² .............................................. G01L 1/16
[52] U.S. Cl. ........................................ 100/99; 100/50
[58] Field of Search ................... 100/50, 99; 73/764, 73/760

[56] References Cited

U.S. PATENT DOCUMENTS

| | | | |
|---|---|---|---|
| 2,991,531 | 7/1961 | Gates | 100/99 X |
| 3,446,063 | 5/1969 | Wintriss | 100/99 X |
| 3,612,966 | 10/1971 | Dybel | 317/123 |
| 3,884,068 | 5/1975 | Dybel | 73/DIG. 4 X |
| 3,930,248 | 12/1975 | Keller | 100/99 X |
| 4,010,679 | 3/1977 | Dybel | 100/53 |
| 4,048,848 | 9/1977 | Dybel | 73/141 A X |
| 4,059,991 | 11/1977 | Dybel et al. | 73/764 |
| 4,062,055 | 12/1977 | Dybel et al. | 361/160 |
| 4,116,050 | 9/1978 | Tanahashi et al. | 100/99 X |

Primary Examiner—Jerry W. Myracle
Attorney, Agent, or Firm—Wegner, Stellman, McCord, Wiles & Wood

[57] ABSTRACT

An improved instrument for measuring and indicating the load experienced during a cycle of a machine, as a reciprocating press. A piezoelectric transducer mounted on the press provides a signal which is proportional to the press frame deformation during operation. In one aspect of the instrument, the signal from the transducer is amplified and compared with reference voltages representative of excessive machine load and a minimum load level. During each cycle of operation either a NORMAL, UNDER or OVER (LOW, OK or HI) indicator is actuated. The NORMAL indicator remains on so long as the machine load is within the selected limits represented by the reference voltage. A safety circuit stops the press when an excessive load is experienced. In another aspect of the instrument, the reverse load experienced by the machine is detected.

6 Claims, 6 Drawing Figures

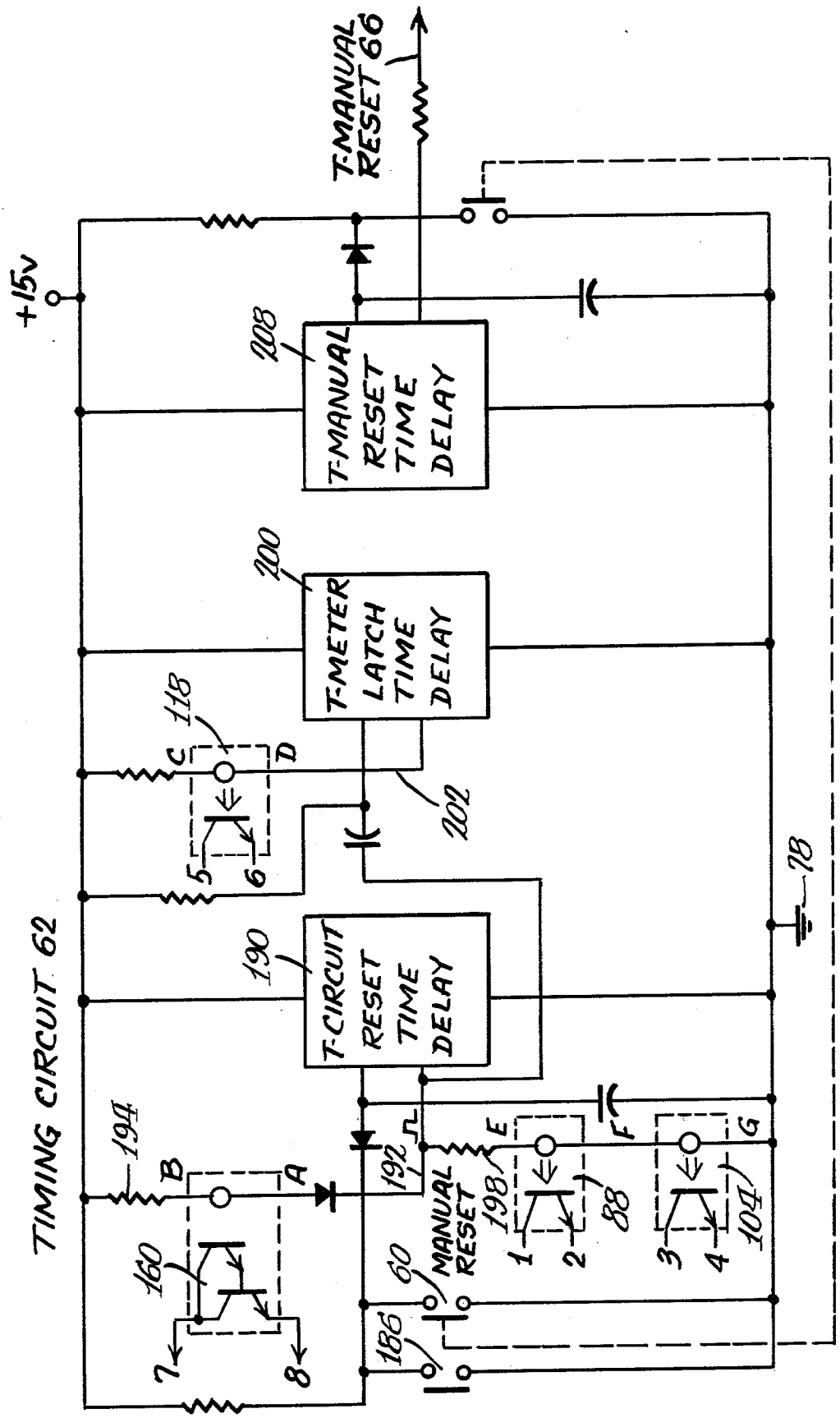

SENSOR FOR RECIPROCATING PRESS

BACKGROUND OF THE INVENTION

This invention relates to the measurement of loads on reciprocating machines.

It is desirable to measure the load on a machine to detect overloads and underloads so that the cause may be located and corrected before the machine or the tooling is damaged. It is known to mount a transducer, as a piezoelectric sensor, on a frame member of the press and to derive therefrom a voltage proportional to the load experienced by the frame member.

We have developed an improved instrument which monitors the load signal and affords a continuous indication whether the load on each cycle is NORMAL, OVER or UNDER, sometimes also identified as OK, HI or LOW.

SUMMARY OF THE INVENTION

A reciprocating press having a piezoelectric transducer which provides a voltage proportional to the load on the machine during each cycle is coupled to an improved detector and display circuit. The circuit amplifies the signal received from the transducer and compares it with HI and LOW load references. Indicators responsive to the comparator indicate whether the load is HI, LOW or OK. A circuit for disengaging the press stops operation in the event that the load is excessive. At the end of each cycle, the circuit is reset to accept the next voltage pulse from the transducer.

It is a feature of the invention to provide a circuit which is capable of distinguishing among an insufficient load, a sufficient load and an excessive load.

Another feature of the present invention is to provide a circuit wherein the reference voltages corresponding to excessive and to the insufficient loads are adjustable.

A further feature of the present invention is to provide a circuit that resets at the end of each cycle of the press and maintains an indication of normal operation unless and until the press experienced an excessive load.

Yet another feature of the invention is the provision of a novel circuit for detecting and displaying reverse load on a reciprocating machine.

Further features will be apparent from the following specification and from the drawings, in which.

Figure 2:
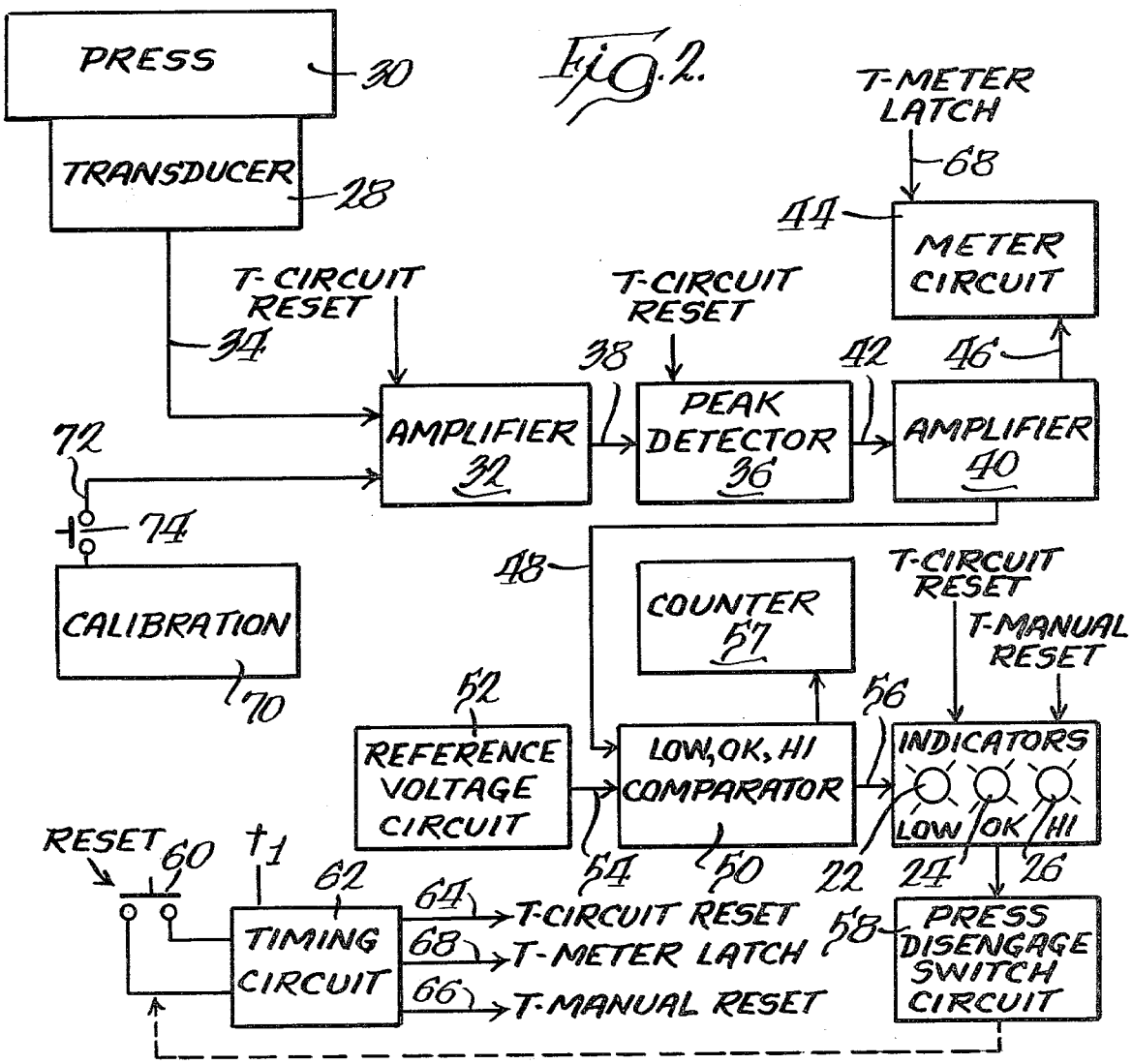
FIG. 2 is a block diagram of the instrument.
Figure 3A:
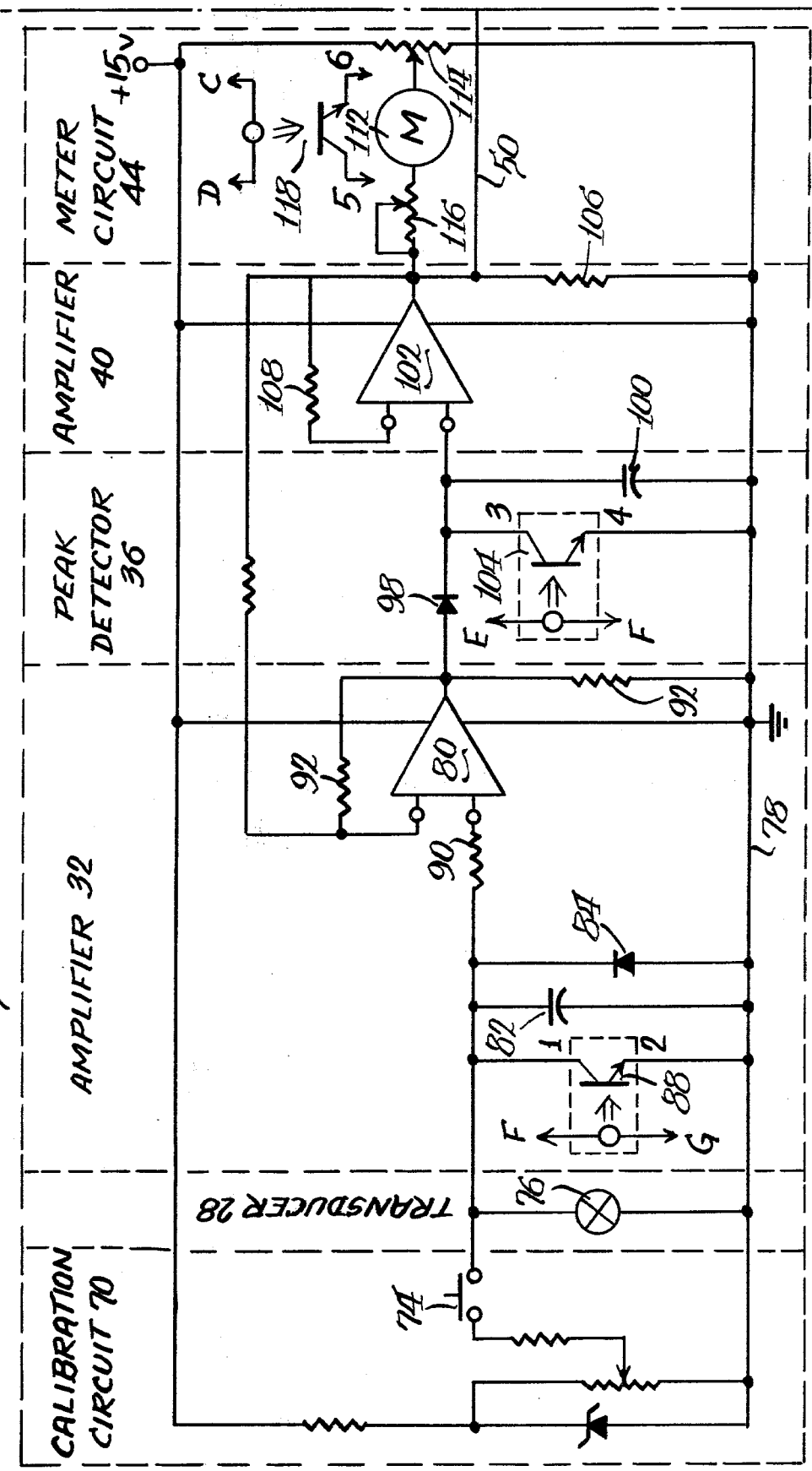
Figure 3B:
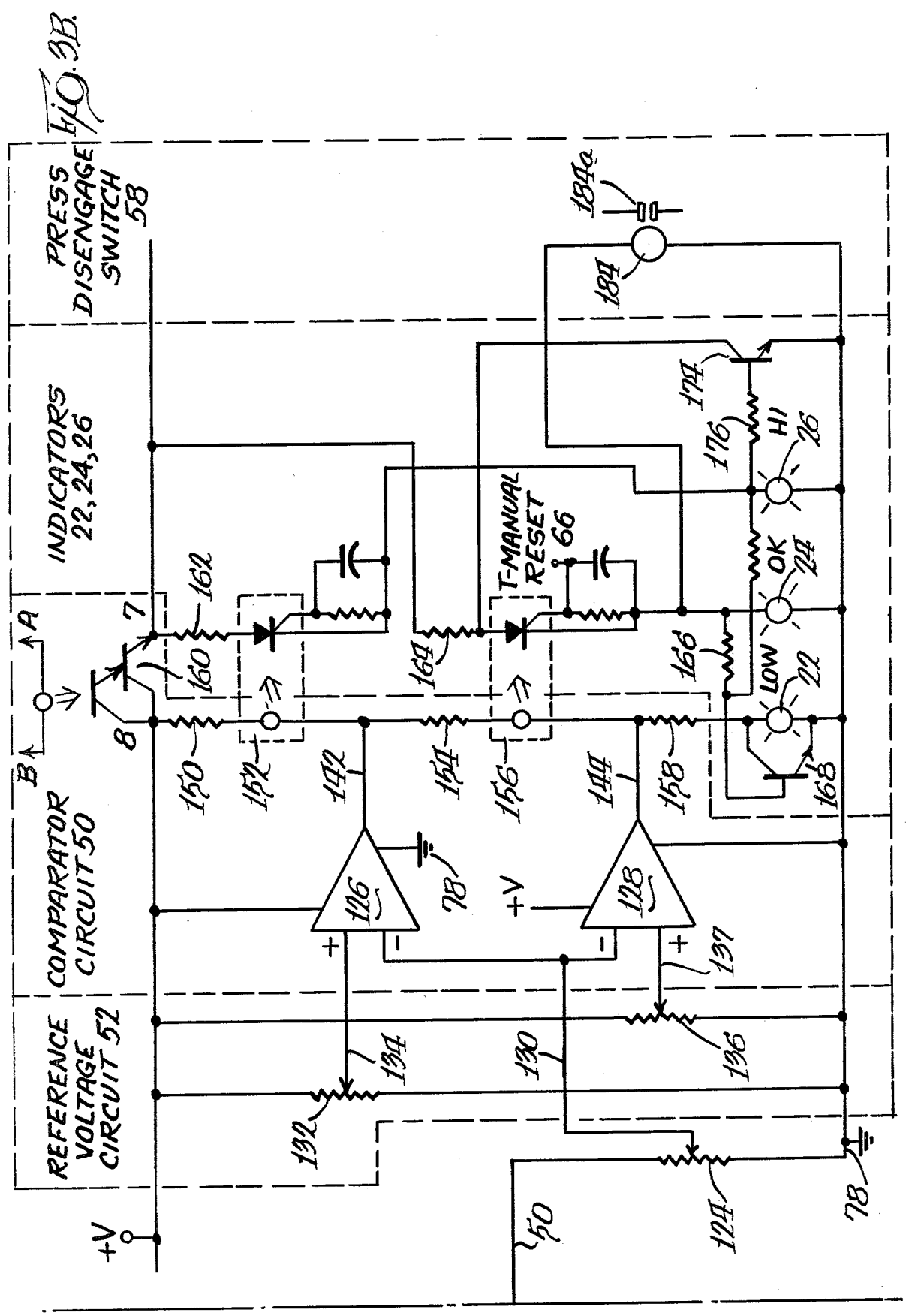

FIGS. 3(a) and 3(b) show a schematic diagram of a portion of the circuit of FIG. 2;

FIG. 4 is a schematic diagram of the timing circuit of FIG. 2; and

Figure 5:
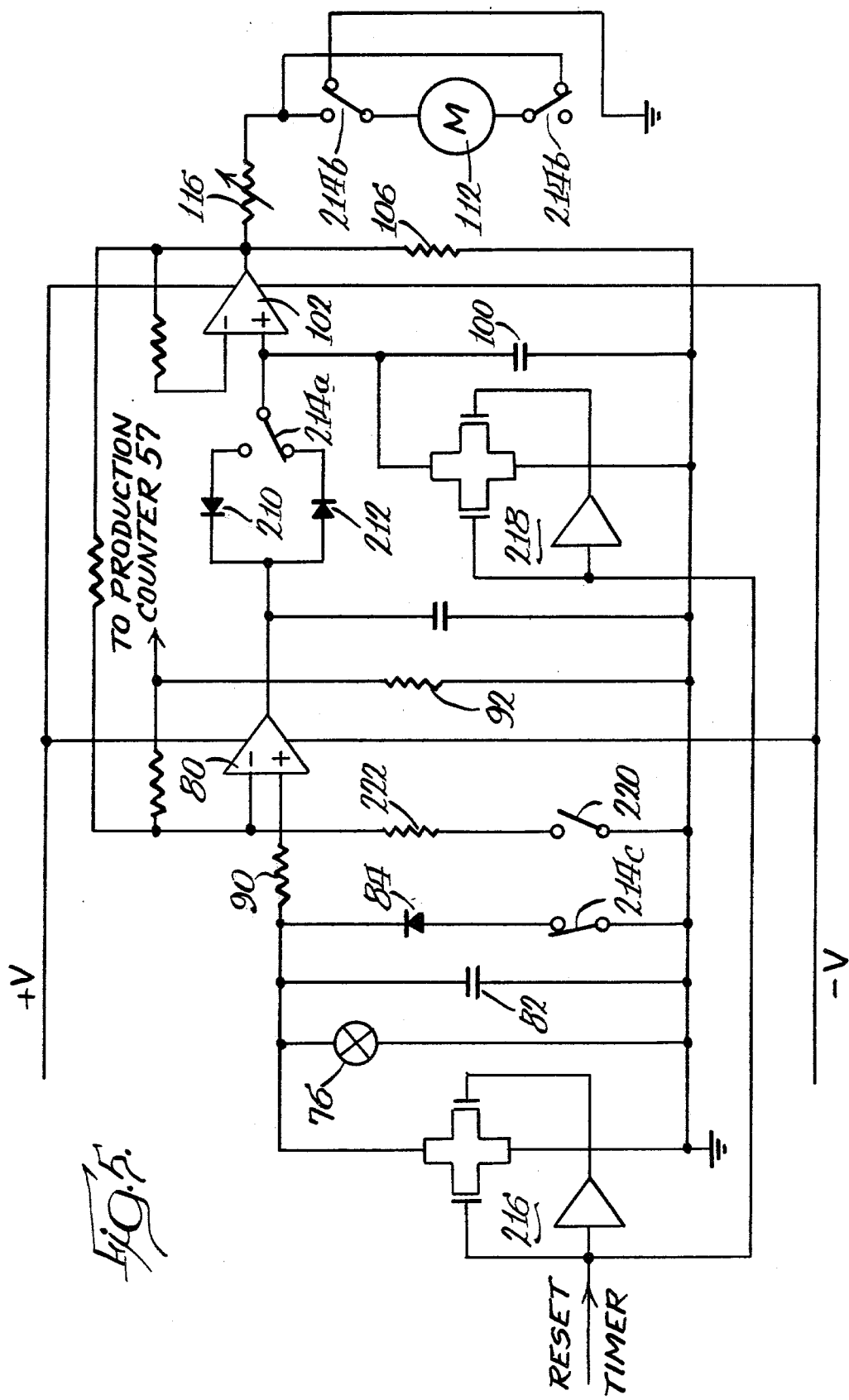

FIG. 5 is a schematic diagram of a modified circuit for detecting and displaying the reverse load experienced by the machine.

DESCRIPTION OF PREFERRED EMBODIMENT

Figure 1:
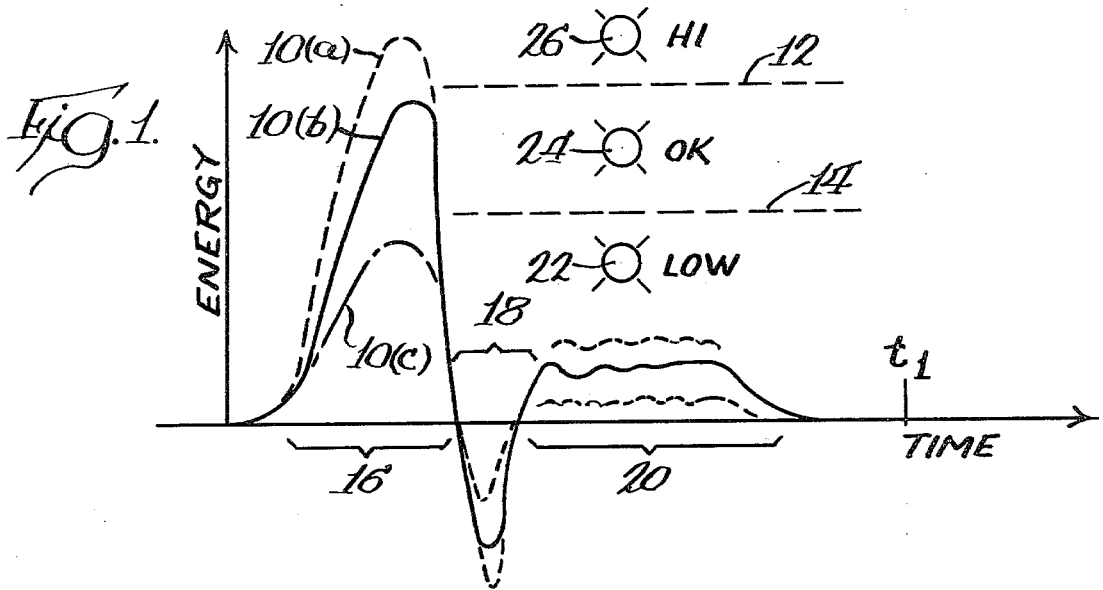
FIG. 1 is a plot of the load experienced by a reciprocating machine as a function of time.

Referring to FIG. 1, a graph of load experienced by a reciprocating press during a single cycle of operation is shown as a function of time. Curve 10(a) depicts the condition where the load is excessive since the amplitude exceeds the HI reference line 12. Curve 10(b) depicts the condition where the load is neither excessive nor insufficient since its amplitude is between the HI reference line 12 and LOW reference line 14. Similarly, curve 10(c) depicts the condition where the load is insufficient since it does not reach LOW reference line 14. The load, irrespective of its amplitude, generally follows the curves of FIG. 1, with a section 16 indicative of the direct peak load followed by a reverse load 18, sometimes referred to as "break-through load," and finally section 20 which damps to zero over a period of time, sometimes identified as a stripper spring action.

The load on the machine varies from workpiece to workpiece and it is desirable to measure that load for each cycle of operation. LOW indicator 22, OK indicator 24 and HI indicator 26 of the circuit shown in FIGS. 2 and 3 provides a visual indication of the load condition. HI and LOW reference lines 12 and 14 are usually expressed as a percentage of the full load capability of the machine as will be explained in greater detail. The vertical position of the reference lines 12 and 14 (percentages of the load) may be established by the circuits shown in FIGS. 2-4 to desired levels depending on the machine and the work it is performing.

Referring to the block diagram of FIG. 2, transducer 28 is secured to a frame member of a press 30 in a suitable manner, as, for example, shown in Budraitis U.S. Pat. No. 3,858,440.

The signal from transducer 28 is connected to an amplifier circuit 32 by line 34. The amplified signal is applied to peak detector 36 by line 38, and the peak signal is connected to amplifier 40 by line 42. The output of amplifier 40 is connected to meter 44 by line 46.

Meter 44 provides a visual display of the load on the press during each cycle of operation.

The output of amplifier 40 is also connected through line 48 with comparator 50. Reference voltage circuit 52 provides LOW and HI reference voltages on line 54 to which the load signal is compared. If the load signal is less than the established LOW reference voltage, LOW indicator 22 is actuated. Conversely, if the load signal is greater than the established HI reference voltage, HI indicator 26 is actuated. If the load signal is greater than the established LOW reference voltage, but less than the established HI reference voltage, OK indicator 24 light is actuated.

Counter 57 may be coupled to comparator 50 and actuated on each cycle of the machine in which a workpiece is processed, recording actual output rather than the number of machine cycles.

Disengage switch circuit 58 is coupled to the indicators 22, 24 and 26 and stops the press 30 in the event that the load is excessive. Manual reset switch 60 may be actuated to restart the machine.

Timing circuit 62 is responsive to the occurrence time T1 (FIG. 1), which time represents the end of a completed machine cycle and to the closing of manual reset switch 60. During normal operation, timing circuit 62 clears amplifier 32 and peak detector 36 at the end of each machine cycle. Amplifier 32 and peak detector 36 are cleared by a pulse, T-circuit reset, from timing circuit 62 available on line 64. In the event press disengage switch circuit 58 causes operation of the press 30 to cease and manual reset switch 60 is depressed, a signal, T-manual reset, on line 66 is provided to OK indicator 24 to turn it on after a time delay established by the timing circuit 62. The T-manual reset provided to the OK indicator 24 remains on during normal operation and until and unless excessive energy is subsequently delivered to the workpiece. Timing circuit 62 also provides a signal T-meter latch on line 68 to meter circuit 44 after a time delay is established by the timing circuit 62 to latch the meter where a digital display is used.

Calibration circuit 70 is coupled to amplifier 32 by line 72 having connected therein momentary contact switch 74. Calibration circuit 70 provides a voltage representation of 100% press load to amplifier 32 which is used to calibrate the entire circuit.

Referring to FIG. 3, transducer circuit 28 consists of a piezoelectric sensor 76 suitably attached to the press 30 in the manner discussed above. The piezo element has one terminal connected to ground 78 and the other connected with the direct input of operational amplifier 80. Piezo element 76 is shunted by capacitor 82, the size of which is selected during the calibration of the measuring system. The piezo element is preloaded with a static compressive force and has a static output voltage such that tension in the press member during operation will not reduce the output below zero. Diode 84, connected in parallel with the piezoelectric sensor 76 shunts any reverse polarity signal. Photo transistor switch 88, responsive to timing circuit 62, is connected across capacitor 82 to discharge it at time T1. Resistor 90 couples the signal from the piezo element 76 to the operational amplifier 80. Biasing resistor 92 and feedback resistor 94 are selected to establish appropriate operating conditions for amplifier 80.

The output of amplifier 80 is a signal of the character illustrated in FIG. 1 and is connected to the peak detector circuit 36 comprising a series diode 98 and a shunt capacitor 100. The voltage across capacitor 100 is connected with the direct input of operational amplifier 102. Photo transistor switch 104 is connected across the storage capacitor 100, and responsive to timing circuit 62, discharges storage capacitor 100 at time T1. Biasing resistor 106 and feedback resistor 108 are selected to establish operating conditions for amplifier 102.

The output of operational amplifier 102 developed across shunt resistor 106 is provided to meter circuit 44 and to comparator circuit 50. Meter circuit 44 includes analog meter 112 which is responsive to the difference between the voltage from the output of the operational amplifier 102 and the voltage provided to the meter by way of variable zero set resistor 114. Variable resistor 116 connected in series with the meter is adjusted to calibrate the meter indication. If a digital display (not shown) with an analog-to-digital converter is substituted for analog meter 112, phototransistor switch 118, responsive to timing circuit 62, latches the display.

The output from amplifier 102 is coupled to potentiometer 124 and to comparators 126 and 128. Variable resistor 132, connected between the DC supply and ground 78, establishes the HI reference voltage, representative of HI reference line 12 in FIG. 1, and connected with HI comparator 126 by line 134. Similarly, variable resistor 136 provides a LOW reference voltage, representative of LOW reference line 14 in FIG. 1 on line 137 to comparator 128.

HI and LOW comparators 126 and 128 are operational amplifiers connected between DC supply and circuit ground 78. The output 142 of HI comparator 126 is the DC supply voltage so long as the reference voltage on line 134 is greater than the load signal on line 130. The comparator output goes to ground if the load signal exceeds the reference voltage 134. Similarly, the output of LOW comparator 138 is ground so long as the reference voltage on line 137 is less than the load signal on line 130, and is the source voltage when the reference voltage exceeds the load signal.

With the supply voltage at HI comparator output 142, there is no current flow through resistor 150 and photo SCR switch 152. However, when a ground appears at output 142, current flow is established through photo SCR switch 152, turning it on. A positive voltage on output 142 and a ground on output 144 from operational amplifier 128 causes current to flow through resistor 154 and photo SCR switch 156, causing photo SCR switch 156 to turn on. If the 15-volt supply appears on output 144, current flow is established through resistor 158 and LOW indicator 22 to ground, causing the LOW indicator to light. The comparator circuit 54 also includes a Darlington pair reset circuit 160, responsive to timing circuit 62, which provides voltage to the indicators and to the press disengage switch circuit 58. The voltage reset circuit 160 is turned on by T-circuit reset, as will be explained below.

LOW indicator 22 is directly connected to the comparator circuit 154, as explained above. OK indicator 24 and HI indicator 26, however, are responsive to the condition of the photo SCR switch 152 and 156. When the load signal is between the HI and LOW limits, the output of comparator 126 is high and that of comparator 128 is low. Photo SCR 156 conducts and OK lamp 24 is actuated. When an excessive load is sensed the output of HI comparator 126 goes to ground and photo SCR switch 152 turns on current through resistor 162 and actuating HI indicator 26. Transistor 168 is responsive to the voltage drop across OK indicator 24 and HI indicator 26 shunting LOW indicator 22 so that the LOW indicator is not actuated regardless of the output of comparator 128.

Specifically, T-manual reset signal on line 66 is applied to the gate of photo SCR 156 to cause OK indicator 24 to turn on upon the reception of the T-manual reset signal.

When HI indicator 26 is on, transistor 174 is forward biased disabling photo SCR switch 156 and the OK indicator 24.

Press disengage switch 58 is responsive to the condition of the OK indicator 24. As long as OK indicator 24 is on, relay 182 is energized closing contacts 184a and normal operation of press 30 continues. In the event an excessive load occurs, HI indicator 26 is actuated, transistor 174 conducts and relay 184 is released.

Referring to FIG. 4, timing circuit 62 is shown. The timing circuit 62 is responsive to a signal provided by a cam switch 186 on the machine, at time T1 at the end of the machine cycle. Switch 186 actuates time delay circuit 190. The time delay circuit 190 has an output at 192 which is normally circuit ground. However, when transistor 186 conducts, a positive pulse is provided on output 192. With a ground normally available on output 192, voltage reset circuit 160 (FIG. 2) remains on since current flows through resistor 194, voltage reset circuit 160, and diode 196 to ground. Upon the occurrence of the positive pulse on output line 192, voltage reset switch 160 is turned off momentarily to permit SCR's 152, 156 to reset. Also, a pulse on output 192 momentarily causes current to flow through resistor 198 and photo transistors 88 and 104, discharging capacitors 82 and 100 (FIG. 3). Output 192 is also coupled to T-meter latch time delay circuit 200. So long as the machine continues to operate the output 202 is high. If the machine stops, as from an overload, output 202 goes to ground. After a specified time delay, as 5 to 10 seconds, and photo transistor switch 118 conducts, latching a digital display if one is used.

Manual reset switch 60 energizes the circuit and the press after the press disengage switch circuit 58 has caused the press to stop its normal operation. By closing reset switch 60, the various signals discussed above are provided to the points on the circuit in a similar manner. Also, manual reset switch 60 causes T-manual reset time delay circuit 208 to provide an output pulse on line 66 after a one-second time delay, turning on OK indicator 24.

Additional controls and outputs may be connected with the indicator circuits. If a LOW load condition may result in damage to the machine or tooling, a circuit may be connected across LOW indicator 22 to stop the machine. Production counter 57, FIG. 2, may be connected across OK indicator 24. An overload counter may be connected across HI indicator 26 to record the number of overloads which occur. If an occasional overload is not dangerous, the overload disengage circuit may be connected with the overload counter to operate upon a predetermined overload count.

Additional parameters may be utilized to control relay 184, as, for example, sensors to detect stock misfeed or buckling or an absence of stock so that the machine is stopped when stock is not available. An ejected part detector may be incorporated to stop the machine if a part is not delivered from the machine on each cycle.

The low limit reference potentiometer 136 may be set for a level, as 5% of rated load, to function as an indication of sensor or cable fault. In this case the potentiometer will not be available to the user for adjustment. If no signal is received, a sensor fault indication is given.

A modified circuit suitable for measuring the reverse load, section 18 of the load curve in FIG. 1, is illustrated in FIG. 5. Elements of the circuit which are common to FIG. 3 will be given the same reference numerals. Piezo sensor 76 is shunted by capacitor 82 and connected through series resistor 90 with amplifier 80. The amplifier is operated between positive and negative DC supplies. The output of amplifier 80, developed across a resistor 92, is connected with a pair of oppositely poled diodes 210, 212, one of which is selected by switch 214. Through actuation of switch 214a, the direct load signal may be detected through diode 212 or the reverse load signal through diode 210. The peak voltage appears across capacitor 100 and is connected with amplifier 102 which also operates between the positive and negative voltage supplies. The output of amplifier 102, developed across resistor 106, is connected through calibrating resistor 116 with meter 112. Where an analog meter is used, switch 214b reverses the meter connection. Diode 84 is connected across the sensor through section 214c of the reversing switch so that it reduces noise for forward operation but is out of the circuit for reverse load measurement.

Connected in parallel with capacitors 82 and 110 are analog switches 216, 218, respectively, actuated by the timer 190 to discharge the amplifier circuit. The analog switches have a higher open circuit impedance than photo transistor switches 88, 104 and do not undesirably load the circuit. A range-changing switch 220 may be actuated to connect resistor 222 in the feedback circuit of amplifier 80 increasing the gain to provide a meaningful meter reading when the machine is operating empty. This may be used in adjusting tooling, for example. Production counter 57 may be connected with the output of amplifier 80, rather than in the comparator and indicator circuit.

We claim:

1. In a reciprocating press having a piezoelectric transducer providing a voltage proportional to load during a cycle of the machine, an improved circuit for measuring the reverse load on the machine, comprising:
   an amplifier connected with said transducer and having an output signal with a peak of one polarity indicating the direct load on the machine and a peak of the opposite polarity indicating the reverse load on the machine;
   a circuit connected with the amplifier output for selecting one portion of the output signal having a polarity corresponding with the load to be measured; and
   means for detecting and displaying the amplitude of the selected signal portion.

2. The reverse load measuring circuit of claim 1 in which the selecting circuit includes a pair of diodes poled to pass signals of opposite polarity and a switch for selecting the signal from one of the diodes.

3. The reverse load measuring circuit of claim 2 in which said detecting means includes the selected diode and a capacitor with an amplifier having an input connected across the capacitor.

4. The reverse load measuring circuit of claim 1 in which said means for detecting and displaying the selected signal includes an amplifier operated between positive and negative voltage sources.

5. The reverse load measuring circuit of claim 4 including a visual display meter connected with the output of said amplifier.

6. The reverse load measuring circuit of claim 5 in which said meter has a zero set control including a potentiometer connected between said positive and negative voltage sources.

* * * * *